United States Patent [19]

Paulsson

[11] Patent Number: 4,890,180
[45] Date of Patent: Dec. 26, 1989

[54] SERIES CAPACITOR EQUIPMENT
[75] Inventor: Lars Paulsson, Västerås, Sweden
[73] Assignee: Asea Brown Boveri AB, Västerås, Sweden
[21] Appl. No.: 252,338
[22] Filed: Oct. 3, 1988
[30] Foreign Application Priority Data Oct. 2, 1987 [SE] Sweden ................................ 8703806

[51] Int. Cl.⁴ .............................................. H02H 7/16
[52] U.S. Cl. ........................................ 361/16; 361/56; 361/130
[58] Field of Search .................... 361/15–17, 361/58, 129, 130

[56] References Cited

U.S. PATENT DOCUMENTS

| | | | |
|---|---|---|---|
| 3,418,530 | 12/1968 | Cheever | 361/130 X |
| 3,963,965 | 6/1976 | Kunkle | 361/130 |
| 4,625,254 | 11/1986 | Fahlén | 361/16 |
| 4,703,385 | 10/1985 | Stenström | 361/56 X |

Primary Examiner—Todd E. DeBoer
Attorney, Agent, or Firm—Pollock, Vande Sande & Priddy

[57] ABSTRACT

Series capacitor equipment is connected into an electric power transmission line (L) and has a capacitor bank with a first part (CO) series-connected with a second part (C1–Cn) with variable capacitance. For protection against overvoltages, a first spark gap protective means (GO, T, TE) is connected across the first part, and a second spark gap protective means, connected in series with said first spark gap protective means, is connected across the second part of the bank. The point of connection (A) of the spark gap protective means is connected to the point of connection (B) of the bank parts through a resistor (R). The first spark gap protection means is adapted to be ignited at a predetermined level of the current in the power transmission line, the voltage drop across the resistor (R) then causing said second spark protective means (G) to become ignited.

8 Claims, 5 Drawing Sheets

SERIES CAPACITOR EQUIPMENT

TECHNICAL FIELD

The present invention relates to series capacitor equipment having a capacitor bank for connection into an electrical power transmission line.

BACKGROUND ART

It is known to use series capacitor equipment in electric power transmission lines to increase the transmission capacity of the lines. Equipment of this kind is particularly used in high voltage transmission lines for power transmission over long distances.

To protect a series capacitor against overvoltages, it is known to use varistors, spark gaps and electric switches in various combinations. Such overvoltage protective means are previously known from, for example, Swedish published patent application No. 358,509 and U.S. patent specification Nos. 4,028,592, 4,625,254 and 4,652,963. Since a series capacitor is often essential for the stability of a power network, it is of importance that it is not shunted other than when it is inevitably necessary to avoid damage caused by overvoltages. Since very high overvoltages may occur across a series capacitor in the case of short circuits or other disturbances in the power network, it is furthermore of the utmost importance to have an overvoltage protective means which, with great reliability, starts to function when this is necessary to protect the capacitor against damage.

In conventional series capacitor equipment, the above requirements are fulfilled to a satisfactory extent by prior art overvoltage protective means of, for example, the types described in the above-mentioned publications.

However, it has been proposed to design series capacitor equipment with a variable capacitance. By means of such equipment in a power network, the distribution of the load flux between the different branches of the network could be controlled in a rapid and simple manner. Such capacitor equipment would conveniently consist of a fixed part connected in series with a variable part, where the latter part would consist of a plurality of series-connected partial capacitors arranged to be switched in or shunted by means of electromechanical or static switching members.

Providing an overvoltage protective means for a variable series capacitor has proved to involve problems. Arranging one single overvoltage protective means in parallel with the entire series capacitor equipment is not practical since the voltage, at which the protective means is to be activated, varies within wide limits with the number of switched-in capacitor steps. A possible solution would be to arrange a separate overvoltage protective means in parallel with each partial capacitor. Such equipment would, however, become complicated and expensive, and it has proved to be difficult to provide suitable spark gaps for the relatively low voltages that will typically occur across each partial capacitor.

SUMMARY OF THE INVENTION

The object of the present invention is to provide, for series capacitor equipment with variable capacitance, a simple overvoltage protective means with the greatest possible reliability.

According to the present invention, such equipment will be simple, rapid and extremely reliable since it can be built up from few simple and robust components in the main circuit and completely without electronic circuits with the ensuing delays and demands for supply voltages.

BRIEF DESCRIPTION OF THE DRAWING

The invention will be described in greater detail below with reference to the accompanying FIGS. 1–5, wherein.

DESCRIPTION OF THE PREFERRED EMBODIMENT

Figure 1:
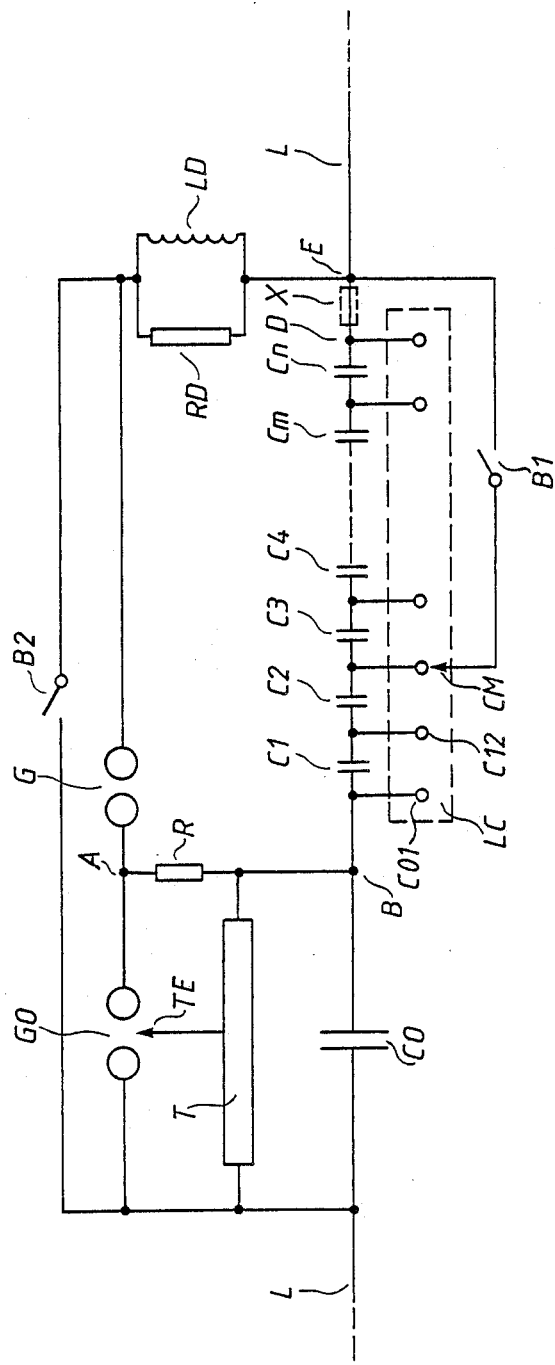
FIG. 1 shows a schematic view of capacitor equipment according to the present invention.

FIG. 1 shows series capacitor equipment connected into an electric high voltage power transmission line L. The equipment comprises a plurality of partial capacitors connected in series with each other. In a known manner, each partial capacitor consists of a plurality of series-parallel connected capacitor elements in such a number, as to obtain the necessary current and voltage handling capacity. The equipment has one part C0 with fixed capacitance and one part C1–Cn with variable capacitance. For controlling the capacitance of the latter part of the equipment, an electromechanical electric switch of tap changer type LC is arranged. This has a number of fixed contacts C01, C12, etc., which are connected to the points of connections between the partial capacitors C1–Cn included in the variable capacitor part. Further, the electric switch has a movable contact CM capable of being moved between the fixed contacts. The electric switch is only schematically shown in FIG. 1 and in practice comprises, in the same way as a transformer on-load tap changer, auxiliary contacts and impedance elements which ensure (a) that switching can be performed without interruption in the main circuit and (b) that short-circuiting of the partial capacitors during the switching operations is prevented. The movable contact CM of the electric switch is connected, through a circuit-breaker B1, to a connection point E to the line L. The circuit-breaker B1 is assumed to be in closed position during normal operation. If it should be necessary, all the partial capacitors in the variable part can be caused to be switched in very rapidly, by opening the circuit-breaker, without having to wait for the relatively slow movement of the electric switch LC.

Points D and E in FIG. 1 may be directly connected to each other as shown by an unbroken line in the figure. Alternatively, an impedance element X, for example a resistor, may be switched in between these points. As a further alternative, if desired, the connection between the two points shown in the figure may be completely omitted.

The equipment is suitably dimensioned such that at least half of the total voltage across the equipment is taken up by the fixed part C0 and, consequently, not more than half thereof is taken up by the variable part C1–Cn. In a typical case, the dimensioning may be such that the fixed part, at nominal line current, takes up a voltage of 45 kV. Each one of the partial capacitors C1–Cn of the variable part takes up the voltage of 3 kV at the same current. The number of partial capacitors in the variable part is assumed to be n=10. Thus, the variable part takes up a nominal maximum voltage of 30 kV, i.e. 40% of the total voltage across the capacitor equipment.

To protect the capacitor equipment against overvoltages, a first spark gap protective means G0 is connected across the fixed part C0 of the equipment and a second spark gap protective means G is connected across the variable part C1–Cn of the equipment. The connection point A between the first and second spark gap protective means is connected to the connection point B between the fixed and variable capacitor parts through a resistor R. Further, the overvoltage protective means comprises a damping circuit consisting of a damping resistor RD and a damping inductance LD and having the function of reducing and damping transients and oscillations which arise when the overvoltage protective means is activated. In a manner known in the art, the overvoltage protective means may comprise varistors, for example zinc oxide varistors, which, for example, may be connected across each one of the partial capacitors in the equipment. Further, in a known manner, the overvoltage protective means comprises a circuit-breaker B2 which, in undisturbed operation, is in the open position and which is closed when the overvoltage protective means is activated by a tripping circuit (not shown) to protect the spark gaps against long-term overcurrents and to form a bypass path, which is as free from losses as possible, past a faulty capacitor equipment.

The spark gap G0 of the first spark gap protective means is provided with a trigger device, in FIG. 1 symbolized as a trigger electrode TE, which is activated by a trigger circuit T. The trigger circuit is connected in parallel with the fixed capacitor part C0 and thus senses the voltage across this capacitor. The voltage thus sensed is proportional to the line current and hence also to the voltage across each one of the partial capacitors in the variable part of the equipment. If the trigger circuit T is adapted to activate the spark gap G0 when the voltage across the capacitor C0 exceeds the nominal voltage by a certain factor, then the voltage across each one of the non-shunted partial capacitors C1–Cn will exceed, by the same factor, the nominal voltage across the partial capacitor.

When the trigger circuit T ignites the spark gap G0, the whole capacitor voltage will instantaneously (apart from any arc voltage drop) be applied across the resistor R. The resistor will then also limit the discharge current of the capacitor C0. The voltage drop across the resistor, as well as the sum of the instantaneous voltages across the switched-in (non-shunted) partial capacitors in the variable part, is applied across the spark gap G which is thus ignited. In this way, an efficient and reliable overvoltage protective means for the capacitor equipment is obtained, which may be built up from conventional spark gaps and other components and which protects the capacitors equally efficiently independently of the number of partial capacitors that are switched in at the time.

The resistor R should be as inductance-free as possible. It may, for example, consist of a porcelain-enclosed ceramic resistor or possibly of a silicon carbide varistor. Its resistance should be so low that a sufficiently high current is obtained to ensure a fully satisfactory functioning of the spark gap G0. Typically, a suitable resistance value has proved to be of the order of magnitude of 100 ohm.

In conjunction with the dimensioning example described above, the overvoltage protective means is assumed to be adapted to start operating at a voltage which, by the factor 2.5, exceeds the nominal voltage. Thus, the spark gap G0 is ignited at a voltage $2.5 \times 45 = 112.5$ kV across the capacitor C0. In the event that all partial capacitors in the variable part are shunted, the voltage across the spark gap G will have the same value, i.e. 112.5 kV, and the firing voltage of the spark gap must not, therefore, exceed this value. In the event that all the partial capacitors in the variable part of the equipment are switched in, the voltage across this part, with the above assumptions, will be $10 \times 2.5 \times 3 = 75$ kV. Thus, the firing voltage of the spark gap G must exceed the mentioned value 75 kV. Spark gaps which meet these requirements can be easily built up of existing components.

After an activation of the overvoltage protective means, the two spark gaps G0 and G will burn until the bypass circuit-breaker B2 is automatically activated and short-circuits the spark gaps. These are then deionized and the capacitor equipment can again be taken into operation by opening the bypass circuit-breaker B2.

The construction of the capacitor equipment and its overvoltage protective means, described above, is only an example and the device can be varied in many ways within the scope of the invention. Thus, for example, the device shown in FIG. 1, resembling a tap changer, for variation of the capacitance of the equipment can be replaced by other members. Thus, for example, a mechanical or static electric switch may instead be arranged in parallel with each one of the partial capacitors of the variable capacitor part. By opening such an electric switch, the corresponding capacitor is switched in, and by closing the electric switch, the partial capacitor is shunted. The electric switches may, for example, consist of antiparallel-connected thyristors.

In FIG. 1 the spark gaps have been shown as simple sphere spark gaps for the sake of simplicity. Such spark gaps can be used, but alternatively, for example, spark gaps which are built up of a plurality of series-connected spark gaps may also be used.

Figure 2:
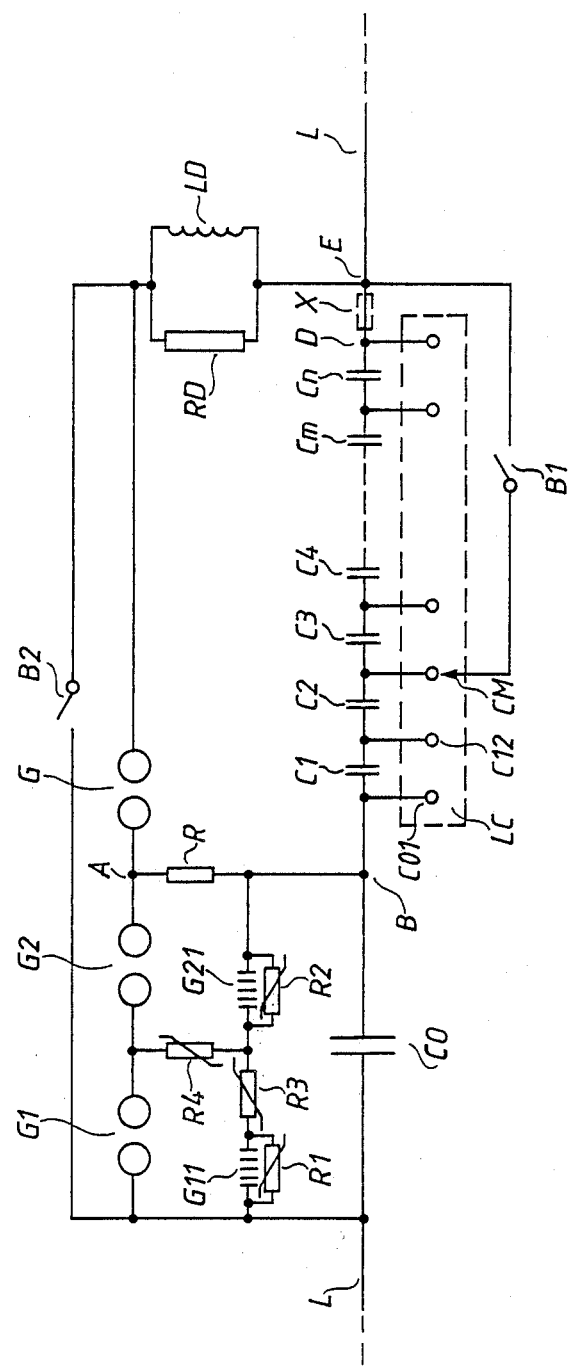
FIG. 2 shows an example of a circuit for triggering the overvoltage protective means in dependence on the voltage across the fixed capacitor part.

FIG. 2 shows capacitor equipment which differs from that shown in FIG. 1 only in the design of the first spark gap protective means, i.e. the spark gap protective means that is connected parallel to the fixed capacitor part C0. This spark gap protective means, shown in FIG. 2, is designed in accordance with the principles described in the above-mentioned Swedish published patent application No. 358 509. The protective means has two series-connected main spark gaps G1 and G2 which form a first chain of spark gaps. In parallel therewith there is connected a control chain which includes two precision spark gaps G11 and G21. Such spark gaps are well known. They have a very well defined firing voltage but are only capable of carrying a limited current. In series with the precision spark gaps, a resistor R3 is connected. In parallel with each precision spark gap, a voltage-dependent resistor, R1 and R2, is connected. A resistor R4 forms a transverse connection between the control chain and the main spark gap chain. The resistors R3 and R4 may be linear or voltage-dependent. The resistors R1 and R2 are relatively high-ohmic and control the voltage distribution uniformly between the two precision spark gaps G11 and G21. When an overvoltage arises which exceeds the firing voltage of the precision spark gaps, these gaps are ignited. The entire overvoltage will then, in principle, be applied across the resistor R3 and hence across the gap G1, which is then ignited. After the ignition of the gap G1, the entire overvoltage is applied across the resistor R4 and hence across the gap G2 which is ignited. Thereafter, the function of the overvoltage protective means follows the same process as has been described above with reference to FIG. 1, that is the voltage across the capacitor G0 is applied across the resistor R, the gap G is ignited and the three spark gaps which are now ignited effectively short-circuit the capacitor equipment and prevent this from being damaged by the overvoltage.

Figure 3:
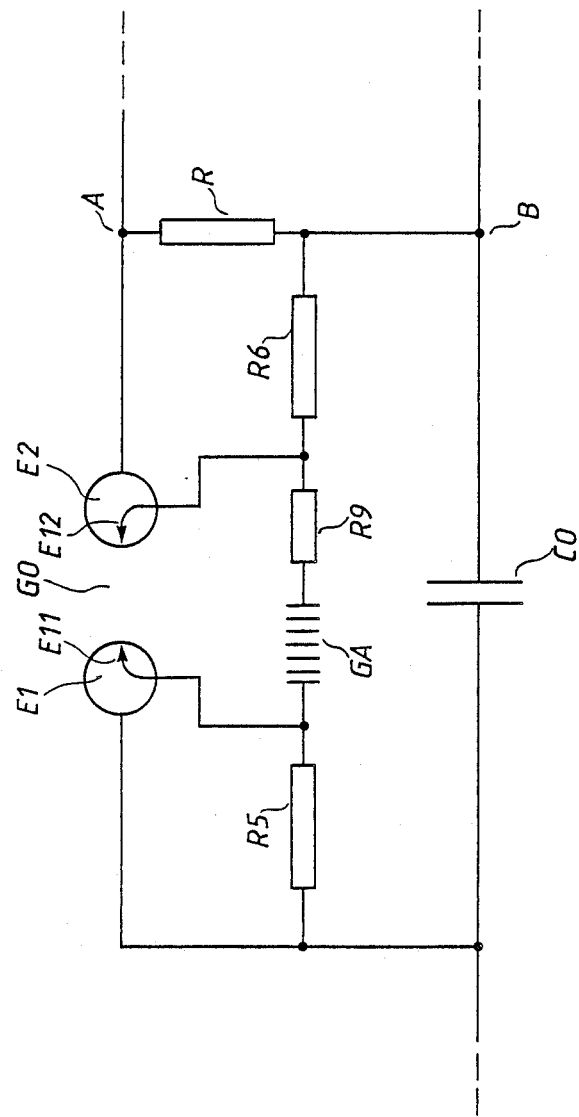
FIGS. 3 and 4 show alternative circuits for triggering the spark gap protective means arranged across the fixed capacitor part.

FIG. 3 shows a further alternative embodiment of the spark gap protective means which is connected in parallel with the fixed capacitor part C0. The spark gap G0 has here two main electrodes E1 and E2. An auxiliary electrode, E11 and E12, respectively, is arranged at each main electrode. In parallel with the spark gap G0 there is arranged a control chain, consisting of two series-connected resistors, R5 and R6, and a precision spark gap GA. When an overvoltage occurs, it will ignite the spark gap GA and is then distributed across the resistors R5 and R6. The voltage drop across each one of these resistors gives rise to a discharge between a main electrode and the corresponding auxiliary electrode, which initiates ignition of the main spark gap G0. The function then follows the pattern described above. In series with the spark gap GA there is arranged a resistor R9, which forces the current over from the spark gap GA to the main spark gap G0.

Figure 4:
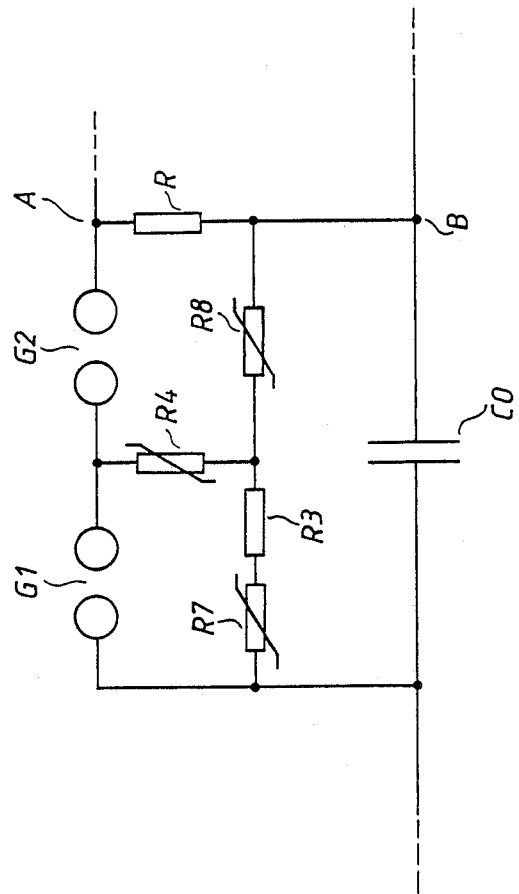

FIG. 4 shows a further embodiment of the spark gap protective means connected in parallel with the fixed capacitor part C0. This embodiment corresponds, in structure and function, to the circuit shown and described with reference to FIG. 2. However, the precision spark gaps G11 and G21 in FIG. 2 are replaced in FIG. 4 by varistors R7 and R8, for example zinc oxide varistors. This makes the control resistors R1 and R2 in FIG. 2 redundant and they may be omitted. The function of the circuit according to FIG. 4 is in all essentials identical with that of the circuit in FIG. 2. When an overvoltage occurs which exceeds the sum of the knee voltages of the varistors R7 and R8, there will be a heavy current through the control chain R7, R3, R8 and hence a heavy voltage drop across the resistor R3. This voltage drop ignites the gap G1, and therefore in a manner described with reference to FIG. 2, also the gap G2.

As will be clear from the foregoing description, the overvoltage protective means according to the invention is adapted so as to start functioning at a certain predetermined level of the line current, which is selected such that the voltage drop across the partial capacitor, determined by this current value and the reactance of each partial capacitor, is prevented from reaching values which are harmful to the capacitor. According to the preferred embodiments described above, the voltage drop across the fixed part C0 of the capacitor equipment is used as a measure of the line current. As will be seen, an extremely simple and robust construction of the overvoltage protective means, as well as a complete elimination of the end of electronic circuits, supply voltages, and the like, are thus obtained. This also means that the circuits described will be very fast. This is of great importance since a delay in ignition may result in an overvoltage assuming a large value before the protective means starts functioning.

In the embodiments of the invention described above, the spark gap which is arranged in parallel with the fixed part of the equipment is provided with a trigger device ("T" in FIG. 1). In those cases where the spark gap (G0 in FIG. 1) has a sufficiently well-defined firing voltage and sufficient current handling capacity, the trigger device can, of course, be dispensed with.

As an alternative to the protective circuits described above, in which the voltage across the fixed capacitor part is used as a measure of the line current, the latter current may be measured directly with the aid of some suitable measuring device, for example a measuring transformer, the secondary voltage of which, when it exceeds a predetermined threshold value, is caused, through suitable tripping circuits, to trigger the first spark gap protective means arranged in parallel with the capacitor part C0.

Figure 5:
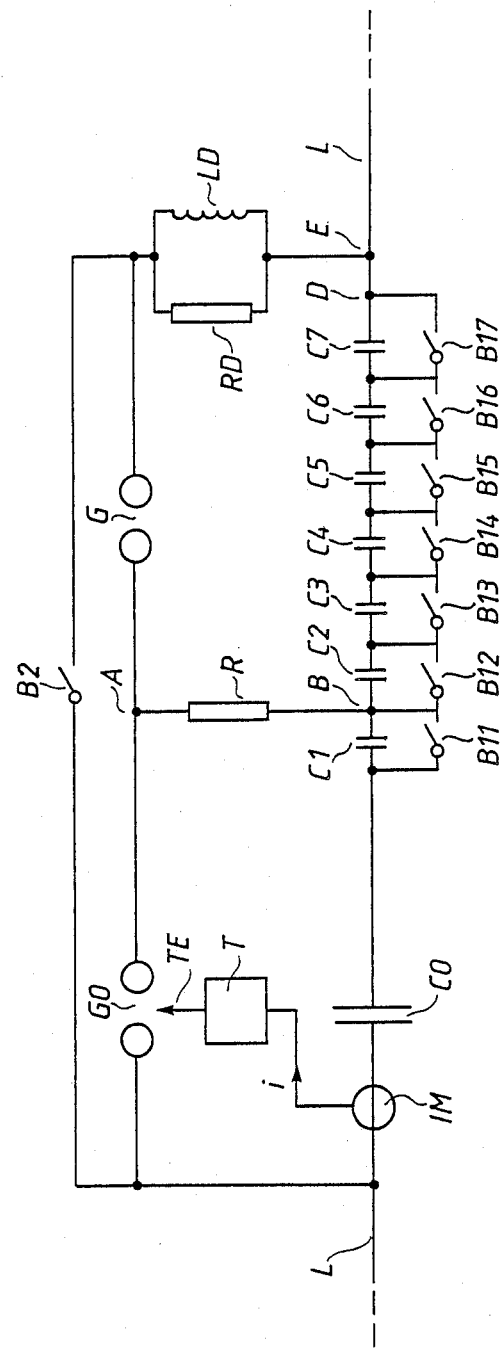
FIG. 5 shows a further alternative embodiment.

FIG. 5 shows an example of such a device. A fixed capacitor part C0 is connected in series with a variable capacitor part consisting of the capacitors C1–C7, the capacitance of the variable capacitor part being variable by means of the switching members B11–B17, which may consist of mechanical or static switching members. As shown in FIG. 5, it is not absolutely necessary for the connection point B of the resistor R to the capacitor chain to coincide with the connection point between the fixed and variable capacitor parts. A measuring transformer IM delivers a signal i, which corresponds to the line current, to a symbolically shown trigger device T, TE, which triggers the spark gap G0 at a predetermined level of the line current.

I claim:

1. An overvoltage protection circuit for series capacitor equipment with a capacitor bank for connection into an electric power transmission line for control of the power line, wherein the capacitor bank has a first part with a fixed capacitance and a second part with a controllable capacitance, the second part being connected in series with the frist part, said protection circuit, comprising:
   a first spark gap protective means connected across the first part of the capacitor bank and including a spark gap;
   a second, spark gap protective means including a spark gap connected in series with said spark gap of said first gap protective means; and
   an impedance element interconnected between the point of connection of the two spark gaps and the point of connection of the two capacitor bank parts;
   wherein, said first spark gap protective means is ignited at a predetermined level of current in the power transmission line, and said second spark gap protective means is ignited responsive to the ignition of said first spark gap protective means by the voltage drop across said impedance element, and the voltage drop across said second part of the capacitor bank.

2. Series capacitor equipment according to claim 1, wherein the impedance element consists of a resistor.

3. Series capacitor equipment according to claim 2, wherein the first spark gap protective means comprises a spark gap chain with two series-connected main spark gaps as well as a control chain, connected in parallel with the spark gap chain, with voltage dependent elements and impedance elements, wherein the control chain at a point between two voltage-dependent elements is connected to the spark gap chain at a point between the two spark gaps for ignition of these spark gaps when the breakdown voltage of the voltage-dependent elements is exceeded.

4. Series capacitor equipment according to claim 1, wherein the first spark gap protective means comprises a spark gap chain with two series-connected main spark gaps and a control chain, connected in parallel with the spark gap chain, with voltage dependent elements and impedance elements, wherein the control chain at a point between two voltage-dependent elements is connected to the spark gap chain at a point between the two spark gaps for ignition of these spark gaps when the breakdown voltage of the voltage-dependent elements is exceeded.

5. Series capacitor equipment according to claim 4, wherein the voltage-dependent elements consist of precision spark gaps.

6. Series capacitor equipment according to claim 4, wherein the voltage-dependent elements consist of varistors.

7. Series capacitor equipment according to claim 1, wherein the first spark gap protective means comprises a main gap with two electrodes and at least one auxiliary electrode, wherein a control chain is connected in parallel with the main gap, the control chain comprising a voltage-dependent element and impedance elements, and wherein the auxiliary electrode is connected to the control chain in such a way that a voltage drop across an impedance element, occurring upon breakdown of the voltage-dependent element, is applied between the auxiliary electrode and a main electrode for ignition of the spark gap.

8. An overlap protection circuit according to claim 1, wherein said second spark gap protective means is connected across said second part of the capacitor bank.

* * * * *